United States Patent
Won (10) Patent No.: US 10,882,748 B2
(45) Date of Patent: Jan. 5, 2021

(54) GRAPHENE SYNTHESIS APPARATUS AND GRAPHENE SYNTHESIS METHOD USING THE SAME

(71) Applicant: HAESUNG DS CO., LTD., Changwon-si (KR)

(72) Inventor: Dong Kwan Won, Seoul (KR)

(73) Assignee: HAESUNG DS CO., LTD., Changwon-si (KR)

( * ) Notice: Subject to any disclaimer, the term of this patent is extended or adjusted under 35 U.S.C. 154(b) by 35 days.

(21) Appl. No.: 16/081,811

(22) PCT Filed: Jul. 26, 2016

(86) PCT No.: PCT/KR2016/007837
§ 371 (c)(1),
(2) Date: Aug. 31, 2018

(87) PCT Pub. No.: WO2017/159929
PCT Pub. Date: Sep. 21, 2017

(65) Prior Publication Data
US 2019/0070578 A1    Mar. 7, 2019

(30) Foreign Application Priority Data

Mar. 15, 2016  (KR) .................. 10-2016-0030944

(51) Int. Cl.
*C01B 32/186*  (2017.01)
*B01J 35/02*   (2006.01)
*B01J 19/18*   (2006.01)
*H01B 5/02*    (2006.01)

(52) U.S. Cl.
CPC ............ *C01B 32/186* (2017.08); *B01J 19/18* (2013.01); *B01J 35/02* (2013.01); *H01B 5/02* (2013.01)

(58) Field of Classification Search
CPC .................................................. C01B 32/186
See application file for complete search history.

(56) References Cited

U.S. PATENT DOCUMENTS

| | | | |
|---|---|---|---|
| 2011/0195207 A1 | 8/2011 | Hong et al. | |
| 2012/0234240 A1 | 9/2012 | Won et al. | |
| 2012/0298396 A1 | 11/2012 | Hong et al. | |
| 2013/0140058 A1 | 6/2013 | Kim et al. | |
| 2014/0014400 A1* | 1/2014 | Mori .................. | B29C 45/1418 174/254 |

(Continued)

FOREIGN PATENT DOCUMENTS

| | | |
|---|---|---|
| CN | 102586869 A | 7/2012 |
| CN | 105209384 A | 12/2015 |

(Continued)

OTHER PUBLICATIONS

English translation KR 101190603, Nam, Dec. 2012 (Year: 2012).*

(Continued)

*Primary Examiner* — Keath T Chen
(74) *Attorney, Agent, or Firm* — Schwabe, Williamson & Wyatt, P.C.

(57) ABSTRACT

Provided is a graphene synthesis apparatus including a chamber; a heating unit provided in the chamber; a heat conversion unit provided closer to a central portion of the chamber than the heating unit; and a catalyst provided on the heat conversion unit, wherein the catalyst is formed of thin and long metal.

16 Claims, 7 Drawing Sheets

(56) References Cited

U.S. PATENT DOCUMENTS

2016/0002036 A1* 1/2016 Kolaczkowski ....... B01J 8/0453
                                                              252/373
2016/0031712 A1   2/2016 Moon et al.

FOREIGN PATENT DOCUMENTS

| CN | 105246588 A | 1/2016 |
|---|---|---|
| JP | 2011162877 A | 8/2011 |
| JP | 2013518804 A | 5/2013 |
| KR | 101190603 B1 | 10/2012 |
| KR | 1020140071551 A | 6/2014 |
| KR | 1020140096648 A | 8/2014 |
| KR | 1020140131632 A | 11/2014 |

OTHER PUBLICATIONS

English translation KR 20140096648, Won, Jun. 2014 (Year: 2014).*
Office Action for Korean Patent Application No. 10-2016-0030944, dated Aug. 10, 2017, pp. 5, no English translation available.
Notice of Allowance for Korean Patent Application No. 10-2016-0030944, dated Dec. 15, 2017; 2 pages; no English translation available.

* cited by examiner

GRAPHENE SYNTHESIS APPARATUS AND GRAPHENE SYNTHESIS METHOD USING THE SAME

CROSS-REFERENCE TO RELATED APPLICATION

The present application is a national phase entry under 35 U.S.C. § 371 of International Application No. PCT/KR2016/007837, filed Jul. 26, 2016, entitled "GRAPHENE SYNTHESIS DEVICE AND GRAPHENE SYNTHESIS METHOD USING SAME," which designates the United States of America, which claims priority to KR Application No. 10-2016-0030944, filed Mar. 15, 2016, the entire disclosures of each of these applications are hereby incorporated by reference in their entireties and for all purposes.

TECHNICAL FIELD

The present disclosure relates to a graphene synthesis apparatus and a graphene synthesis method using the same, and more particularly, to a graphene synthesis apparatus capable of synthesizing a graphene wire, and a graphene synthesis method using the same

BACKGROUND ART

Graphene is a material in which carbons are connected to one another hexagonally to form a honeycomb-like two-dimensional plane structure. Graphene is characteristically very thin and transparent and has very high electrical conductivity. Graphene having the above characteristics has been applied many times to touch panels, transparent displays, or flexible displays.

Graphene is synthesized on a surface of a metal catalyst by a chemical vapor deposition (CVD) method by providing a gas including carbon to the surface.

To synthesize graphene, a graphene synthesis apparatus maintained in a high-temperature environment is needed. As the gas including carbon dissociates under high-temperature conditions, graphene may form on the surface of the metal catalyst.

DETAILED DESCRIPTION OF THE DISCLOSURE

Technical Problem

Provided are a graphene synthesis apparatus capable of synthesizing a graphene wire, and a graphene synthesis method using the same.

Technical Solution

According to an aspect of the present disclosure, a graphene synthesis apparatus includes a chamber; a heating unit provided in the chamber; a heat conversion unit provided closer to a central portion of the chamber than the heating unit; and a catalyst provided on the heat conversion unit, wherein the catalyst is formed of thin and long metal.

Advantageous Effects of the Disclosure

According to an embodiment of the present disclosure, a graphene wire in which graphene is coated on a catalyst having a thin and long wire shape may be easily synthesized.

The effect of the present disclosure may be derived from the following description with reference to the drawings, in addition to the above-described effect.

BEST MODE

According to an aspect of the present disclosure, a graphene synthesis apparatus includes a chamber; a heating unit provided in the chamber; a heat conversion unit provided closer to a central portion of the chamber than the heating unit; and a catalyst provided on the heat conversion unit, wherein the catalyst is formed of thin and long metal.

The graphene synthesis apparatus may further include a quartz wall provided in the chamber, wherein the quartz wall is arranged between the heating unit and the heat conversion unit.

The quartz wall may be arranged in a direction perpendicular to the ground or a direction parallel to the ground.

The catalyst may have a wire shape, and the catalyst may be wound around a surface of the heat conversion unit.

The heat conversion unit may convert radiant heat from the heating unit to conductive heat, and the conductive heat may be directly transferred to the catalyst on a surface of the heat conversion unit.

The heat conversion unit may include graphite.

The heat conversion unit may have a circular or rectangular column shape.

The heat conversion unit may include a first surface; a second surface opposite the first surface; and a hole penetrating from the first surface to the second surface.

A drive unit may be provided in the hole, and the drive unit may be configured to rotate the heat conversion unit clockwise or counterclockwise.

The graphene synthesis apparatus may include a first rotation unit provided at one side of the heat conversion unit, and a second rotation unit provided at another side of the heat conversion unit.

The catalyst having a wire shape may be wound around a surface of the first rotation unit, and the catalyst having a wire shape and on which graphene is synthesized may be wound around a surface of the second rotation unit.

According to another aspect of the present disclosure, a graphene synthesis method includes preparing a chamber including a heat conversion unit and a heating unit, the heating unit provided closer to an edge portion than the heat conversion unit; heating by supplying radiant heat from the heating unit; and supplying a reaction gas to an inside of the chamber, wherein a catalyst formed of thin and long metal is located on a surface of the heat conversion unit.

After the heating is performed, the heat conversion unit may convert radiant heat supplied by the heating unit to conductive heat, and increase a temperature of the catalyst.

The graphene synthesis method may further include, before performing the heating, cleaning by injecting an atmospheric gas or a non-reactive gas.

A quartz wall may be located in the chamber between the heating unit and the heat conversion unit.

In the chamber, a first rotation unit may be provided at one side of the heat conversion unit; and a second rotation unit may be provided at another side of the heat conversion unit.

The graphene synthesis method may further include loading the catalyst from the first rotation unit to the heat conversion unit while the heating and the supplying are being performed.

The graphene synthesis method may further include unloading the catalyst located on the surface of the heat conversion unit and on which graphene is synthesized to the second rotation unit while the heating and the supplying are being performed.

MODE OF THE DISCLOSURE

As the disclosure allows for various changes and numerous embodiments, embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

Hereinafter, the present disclosure will be described in detail by explaining embodiments of the disclosure with reference to the attached drawings. Like reference numerals in the drawings denote like elements, and thus their description will be omitted.

In the embodiments below, it will be understood that although the terms "first," "second," etc. may be used herein to describe various components, these components should not be limited by these terms. These components are only used to distinguish one component from another.

In the embodiments below, the singular forms "a," "an" and "the" are intended to include the plural forms as well, unless the context clearly indicates otherwise.

In the embodiments below, it will be further understood that the terms "comprises" and/or "comprising" used herein specify the presence of stated features or components, but do not preclude the presence or addition of one or more other features or components.

In the embodiments below, it will be understood that when a layer, region, or component is referred to as being "formed on" another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

Figure 1:
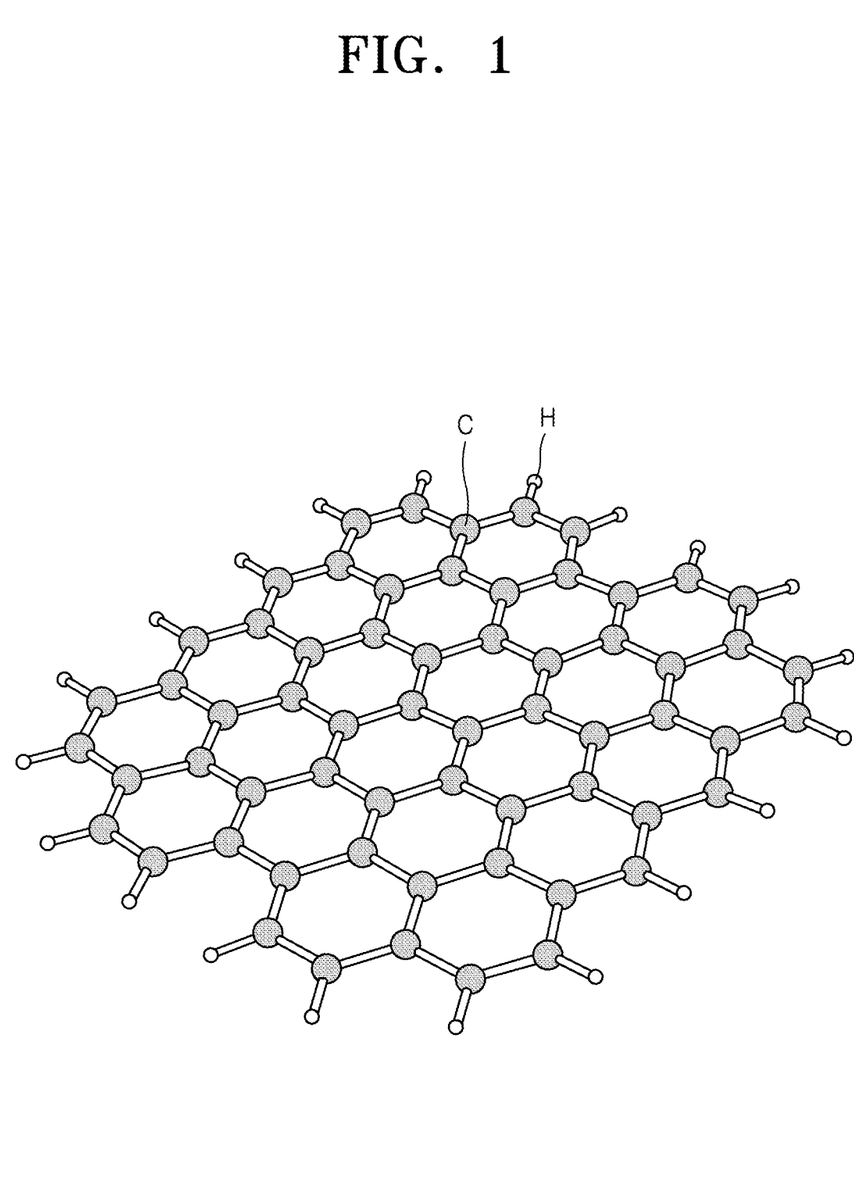
FIG. 1 is a perspective view schematically illustrating graphene described in the present specification.

FIG. 1 is a perspective view schematically illustrating graphene described in the present disclosure.

The term "graphene" used in the present specification denotes that a plurality of carbon atoms are covalently bonded to each other and thus graphene forming polycyclic aromatic molecules is formed in a film shape. The carbon atoms connected in a covalent bond establish a six-membered ring as a basic repeating unit. A five-membered ring and/or a seven-membered ring may be further included. Accordingly, a graphene film includes a single layer of carbon (C) atoms that are covalently bonded (typically, a sp2 bond). The graphene film may have various structures, and the structure may vary according to the content of a five-membered ring and/or a seven-membered ring included in graphene.

The graphene film may be formed in a single layer as illustrated in the drawing, or in a multilayer by stacking a plurality of single layers. An end portion of a side surface of the graphene may be saturated with hydrogen (H) atom.

Graphene is a nano material of a two-dimensional plane structure and may have various physical, chemical, electrical, or optical characteristics. In particular, graphene may have a charge mobility that is about 100 times greater than silicon (Si) and about 150 times greater than copper (Cu), and an allowable current density that is about 100 times greater than copper (Cu).

Furthermore, since graphene is a nano material of a two-dimensional plane structure, graphene may be used by changing a shape of graphene.

Figure 2:
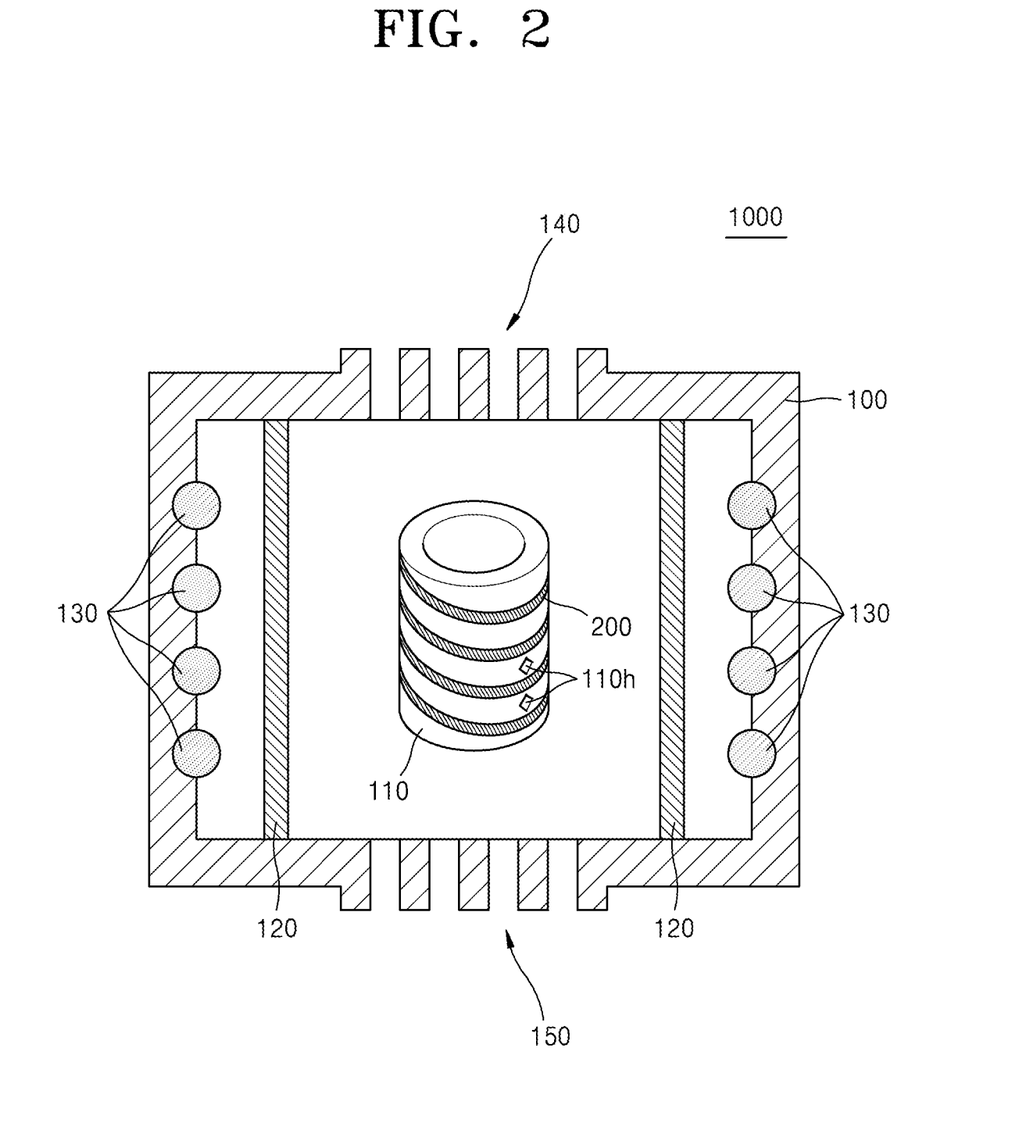
FIG. 2 is a cross-sectional view schematically illustrating a section of a graphene synthesis apparatus according to an embodiment of the present disclosure.

FIG. 2 is a cross-sectional view schematically illustrating a section of a graphene synthesis apparatus 1000 according to an embodiment of the present disclosure.

The graphene synthesis apparatus 1000 according to the present embodiment may include a chamber 100, a heat conversion unit 110 provided in the chamber 100, a heating unit 130, and a catalyst 200.

As a selective embodiment, the chamber 100 may be a hexahedron.

The present embodiment is a case in which the chamber 100 is a hexahedron, as illustrated in FIG. 2, and a section of the chamber 100 is illustrated to be rectangular. However, the shape of the chamber 100 is not limited thereto, and for example, the chamber 100 may be provided as other polyhedron, a polygonal column, a polygonal pyramid, or a sphere, in addition to a hexahedron.

Any heat source capable of generating radiant heat may be provided as the heating unit 130 that is provided in the chamber 100.

As a selective embodiment, the heating unit 130 may be provided on each of three or more surfaces of the chamber 100 or on only one surface thereof.

In the graphene synthesis apparatus 1000 according to the present embodiment, although FIG. 2 illustrates that the heating unit 130 is provided on each of inner surfaces of the chamber 100, facing each other, the position and number of the heating unit 130 are not limited thereto, and one or two or more heating units 130 may be located at any position in the chamber 100.

For example, the heating unit 130 may be a device such as a lamp, an electric heater, or plasma generating device, which is capable of generating heat.

As a selective embodiment, when the heating unit 130 is provided as a lamp, the heating unit 130 may include a halogen lamp. A plurality of halogen lamps may be arranged apart from each other in a certain interval. A halogen lamp may emit near infrared light, medium infrared light, and/or visible light.

The heating unit 130 may further include a window that is not illustrated. The window may be provided to surround the outer circumference of the halogen lamp, or provided at one side of the halogen lamps that are provided parallel to each other in one direction. The window may include a transparent material, for example, quartz. The window may protect the halogen lamp and may improve light efficiency.

The graphene synthesis apparatus 1000 according to the present embodiment may include the heat conversion unit 110 included in the chamber 100. The heat conversion unit 110 may convert radiant heat supplied by the heating unit 130 to conductive heat.

As a selective embodiment, as illustrated in FIG. 2, the heat conversion unit 110 may be located at a central portion of the chamber 100 in the chamber 100.

In other words, the heat conversion unit 110 may be located at the center portion in the chamber 100 and between the heating units 130 provided on the two inner surfaces of the chamber 100 facing each other.

As the heat conversion unit 110 is located between two or more heating units 130, the radiant heat emitted from the heating unit 130 may be more efficiently obtained.

The embodiment illustrated in FIG. 2 is a mere embodiment of the graphene synthesis apparatus 1000 of the present disclosure, and the positions of the heating unit 130 and the heat conversion unit 110 are not limited thereto.

In other words, As a selective embodiment, the heat conversion unit 110 may be located at the central portion of the chamber 100, and a plurality of heating units 130 are located surrounding the heat conversion unit 110 around the heat conversion unit 110, thereby supplying radiant heat to the heat conversion unit 110.

As a selective embodiment, the heat conversion unit 110 may be formed of a material having a temperature that may be increased by the radiant heat.

For example, the heat conversion unit 110 may include a black body. In some embodiments, the heat conversion unit 110 may include metal coated with graphite or an oxide film. Since the heat conversion unit 110 is formed in a black body, reflectivity may be reduced and an absorption rate of radiant heat may be increased.

The heat conversion unit 110 may be of a hollow cylinder type, and a plurality of holes 110h may be formed in a surface of the heat conversion unit 110. The holes 110h facilitate a flow of a gas for synthesizing graphene, and thus graphene may be uniformly synthesized on the catalyst 200 provided on the heat conversion unit 110.

The catalyst 200 may be provided outside the heat conversion unit 110. In other words, the catalyst 200 may be located between the heat conversion unit 110 and the heating unit 130.

As a selective embodiment, the catalyst 200 may be provided on the surface of the heat conversion unit 110.

As a selective embodiment, the catalyst 200 may include metal that is thin and long. In other words, as illustrated in FIG. 2, the catalyst 200, which is metal having a thin and long wire shape, may be provided on the surface of the heat conversion unit 110.

The graphene synthesis apparatus 1000 according to the present embodiment has an advantageous effect of efficiently receiving conductive heat that is converted from the radiant heat by the heat conversion unit 110 as the catalyst 200 is provided on the surface of the heat conversion unit 110.

In other words, there is an advantageous effect in that, since the catalyst 200 having a thin and long wire shape efficiently receives conductive heat, temperature is easily raised to a synthesis temperature of graphene and thus graphene may be easily synthesized.

A graphene synthesis method is described in detail in the description of an embodiment of the graphene synthesis method.

As a selective embodiment, the catalyst 200 may be formed of any metal having a high melting point enough to endure a high temperature of a graphene synthesis process.

For example, the catalyst 200 may include at least one of metals or alloys of copper (Cu), nickel (Ni), cobalt (Co), iron (Fe), platinum (Pt), gold (Au), silver (Ag), aluminium (Al), chromium (Cr) magnesium (Mg), manganese (Mn), molybdenum (Mo), rhodium (Rh), silicon (Si), tantalum (Ta), titanium (Ti), tungsten (W), uranium (U), vanadium (V), palladium (Pd), yttrium (Y), zirconium (Zr), germanium (Ge), brass, bronze, white brass, and stainless steel. However, the present disclosure is not limited thereto, and any metal or alloy having a high melting point may be used therefor.

In the graphene synthesis apparatus 1000 according to the present embodiment, as illustrated in FIG. 2, the catalyst 200 having a wire shape may be provided by being wound around the surface of the heat conversion unit 110 at a certain interval.

As the catalyst 200 is provided on the surface of the heat conversion unit 110 at a certain interval, graphene may be efficiently synthesized over a large area.

The graphene synthesis apparatus 1000 according to the present embodiment may further include a quartz wall 120 provided in the chamber 100. Since the quartz wall 120 is formed of crystal that is transparent and has a high melting point, the quartz wall 120 may transmit the radiant heat supplied from the heating unit 130. The quartz wall 120 may be located surrounding the heat conversion unit 110, and provided to be engaged with an inner wall of the chamber 100, maintaining a vacuous state.

Furthermore, as the quartz wall 120 is arranged between the heat conversion unit 110 and the inner wall of the chamber 100, residue of materials supplied to synthesize graphene may be prevented from being accumulated on the inner wall of the chamber 100. The quartz wall 120 is arranged between the heat conversion unit 110 and the inner wall of the chamber 100, and thus residue of the materials (a gas) supplied to synthesize graphene may be accumulated on the inner wall of the quartz wall 120, rather than on the inner wall of the chamber 100. When the inner wall of the quartz wall 120 is contaminated, only the quartz wall 120 needs to be replaced, and thus maintenance and repair of the graphene synthesis apparatus 1000 may be made easy.

At least two quartz walls may be provided as the quartz wall 120. Although FIG. 2 illustrates that two quartz walls are provided as the quartz wall 120, the present disclosure is not limited thereto, and three or more quartz walls may be provided as the quartz wall 120.

The quartz wall 120 may be provided in the chamber 100 to be located at an edge portion in the chamber 100.

As a selective embodiment, the quartz wall 120 may be arranged between the heat conversion unit 110 and the heating unit 130. In other words, the quartz wall 120 may be arranged between the catalyst 200 that is metal and the heating unit 130.

As an embodiment, as illustrated in FIG. 2, when there are two portions of quartz wall 120, the heat conversion unit 110 may be arranged between the two portions of quartz wall 120. Furthermore, each portion of quartz wall 120 may be arranged between the heat conversion unit 110 and the heating unit 130.

As a selective embodiment, as illustrated in FIG. 2, when there are two portions of quartz wall 120, the two portions of quartz wall 120 may be arranged to face each other.

As a selective embodiment, each portion of quartz wall 120 may be provided in a plate shape.

When each portions of quartz wall 120 is provided in a plate shape, as illustrated in FIG. 2, a section of the quartz wall 120 is illustrated to be rectangular, but the shape of the quartz wall 120 is not limited thereto.

In other words, each portion of quartz wall 120 may be formed to have a cylindrical shape or a rectangular column shape, not a plate shape.

The quartz wall 120 may be provided in a vertical or horizontal direction with respect to the ground.

As illustrated in FIG. 2, in the graphene synthesis apparatus 1000 according to the present embodiment, the quartz wall 120 may be provided in a vertical direction with respect to the ground.

In the graphene synthesis apparatus 1000 according to the present embodiment, as illustrated in FIG. 2, the two portions of quartz wall 120 may be located at an edge portion in the chamber 100, facing each other, in a vertical direction with respect to the ground, and the heat conversion unit 110 may be provided between the two portions of quartz wall 120 facing each other.

However, the graphene synthesis apparatus 1000 illustrated in FIG. 2 is a mere embodiment of the present disclosure, and the quartz wall 120 is provided to maintain a vacuous state of the chamber 100 and may be provided regardless of the direction whether it is vertical or horizontal to the ground.

The graphene synthesis apparatus 1000 according to the present embodiment may further include a gas supply unit 140 and a discharge unit 150.

The gas supply unit 140 may include a plurality of nozzles, and may supply a gas including carbon to the inside of the chamber 100.

The gas including carbon is a reaction gas for forming graphene, and as a selective embodiment, methane ($CH_4$) may be used as the gas.

The gas including carbon is not limited thereto, and one or more gas selected from among a group including a carbon atom of carbon monoxide (CO), ethane ($C_2H_6$), ethylene ($CH_2$), ethanol ($C_2H_5$), acetylene ($C_2H_2$), propane ($CH_3CH_2CH_3$), propylene ($C_3H_6$), butane ($C_4H_{10}$), pentane ($CH_3(CH_2)_3CH_3$), pentene ($C_5H_{10}$), cyclopentadiene ($C_5H_6$), hexane ($C_6H_{14}$), cyclohexane ($C_6H_{12}$), benzene ($C_6H_6$), and toluene ($C_7H_8$) may be used as the gas.

A method of synthesizing graphene using the above-described gas including carbon is described below in detail.

The gas supply unit 140 may supply not only a gas including carbon, but also an ambient gas to the inside of the chamber 100. The ambient gas may include an inert gas such as helium or argon and a non-reactive gas such as hydrogen to maintain a clean surface of a copper wire 200a.

In the present embodiment, a case is described in which the gas supply unit 140 solely supplies both the gas including carbon and the ambient gas, but the present disclosure is not limited thereto. For example, a gas supply unit that supplies the gas including carbon and a gas supply unit that supplies the ambient gas are separately provided, and thus the gas including carbon and the ambient gas may be separately supplied to the inside of the chamber 100.

The discharge unit 150 discharges residual gases remaining after the synthesis of graphene in the chamber 100.

The discharge unit 150 may be disposed at a surface facing the gas supply unit 140, as illustrated in FIG. 2, to maximize a discharge effect. However, this is exemplary and the arrangement structure and number of the discharge unit 150 are not limited to the illustration and may be implemented in various ways.

Figure 3:
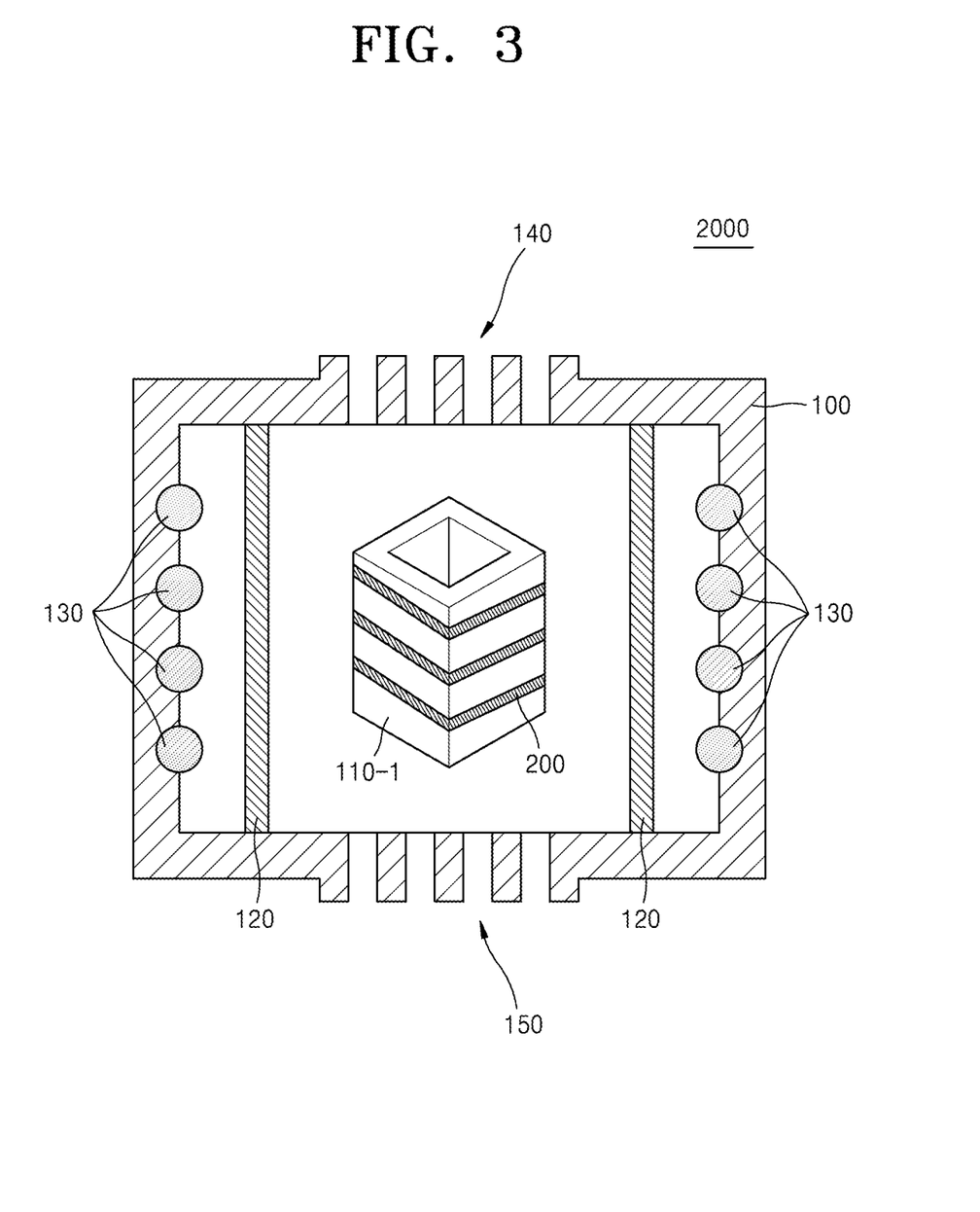
FIG. 3 is a cross-sectional view schematically illustrating a section of a graphene synthesis apparatus according to another embodiment of the present disclosure.

FIG. 3 is a cross-sectional view schematically illustrating a section of a graphene synthesis apparatus 2000 according to another embodiment of the present disclosure. In FIG. 3, the same reference numerals as those of FIG. 2 denote the same elements, and redundant descriptions thereof are omitted for the sake of simplicity.

The graphene synthesis apparatus 2000 may include the chamber 100, a heat conversion unit 110-1 provided in the chamber 100, the heating unit 130, and the catalyst 200. Furthermore, the graphene synthesis apparatus 2000 may further include the quartz wall 120 that is provided to maintain a vacuous state of the chamber 100 or prevent contamination of the chamber 100, and may also further include the gas supply unit 140, the discharge unit 150, a decompression unit (not shown), and a gate (not shown).

Any heat source capable of generating radiant heat may be provided as the heating unit 130 that is provided in the chamber 100.

As a selective embodiment, the heating unit 130 may be provided on each of three or more surfaces of the chamber 100 or on only one surface thereof.

In the graphene synthesis apparatus 1000 according to the present embodiment, although FIG. 3 illustrates an embodiment in which the heating unit 130 is provided on each of two inner surface of the chamber 100, facing each other, the position and number of the heating unit 130 are not limited thereto, and one or two or more heating units 130 may be located at any position in the chamber 100.

As a selective embodiment, the heat conversion unit 110-1 provided in the chamber 100 may be provided at the central portion of the chamber 100. In other words, while the heating unit 130 is provided on the inner surface of the chamber 100, that is, at the edge in the chamber 100, the heat conversion unit 110-1 may be relatively provided at the central portion of the chamber 100.

As illustrated in FIG. 3, in the graphene synthesis apparatus 2000 according to the present embodiment, the heat conversion unit 110-1 may be provided between the heating units 130 that are provided on the two inner surfaces.

As the heat conversion unit 110-1 is located between two or more heating units 130, there is an advantageous effect of efficiently receiving radiant heat emitted from the heating unit 130.

As a selective embodiment, the heat conversion unit 110-1 may have a column shape.

As a selective embodiment, the heat conversion unit 110-1 may have a circular column shape having a circular section, like the heat conversion unit 100 of the graphene synthesis apparatus 1000 illustrated in FIG. 2.

As another selective embodiment, the heat conversion unit 110-1 may have a rectangular column shape having a rectangular section, like the heat conversion unit 100-1 of the graphene synthesis apparatus 2000 illustrated in FIG. 3.

Although, in the embodiments of FIGS. 2 and 3, the heat conversion units 100 and 100-1 are illustrated as a circular column shape and rectangular column shape, respectively, the present disclosure is not limited thereto, and any column shape having a certain height may be employed as the heat conversion unit, regardless of the shape thereof.

As a selective embodiment, any material having a temperature that may be increased by the radiant heat may be used for the heat conversion unit 110.

For example, the heat conversion unit 110 may include metal coated with graphite or an oxide film.

The catalyst 200 may be provided outside the heat conversion unit 110-1. In other words, the catalyst 200 may be located between the heat conversion unit 110-1 and the heating unit 130.

As a selective embodiment, the catalyst 200 may be disposed on a surface of the heat conversion unit 110-1.

As a selective embodiment, the catalyst 200 may include thin and long metal. In other words, as illustrated in FIG. 3, the catalyst 200 in a thin and long wire shape may be disposed on the surface of the heat conversion unit 110-1.

As a selective embodiment, the catalyst 200 may be formed of any metal having a high melting point enough to endure a high temperature of a graphene synthesis process.

Figure 4:
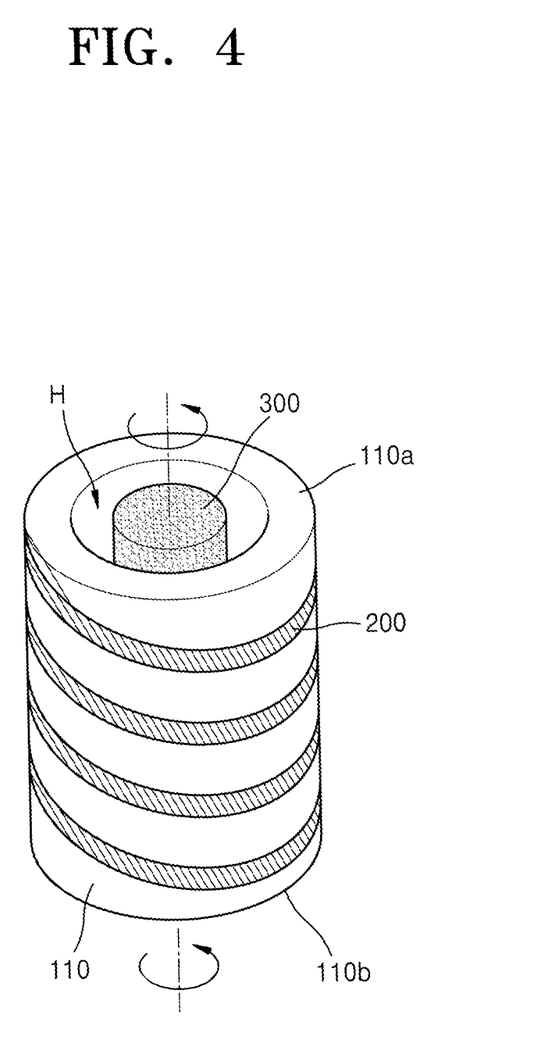
FIG. 4 is a perspective view schematically illustrating a heat conversion unit according to an embodiment of the present disclosure.

FIG. 4 is a perspective view schematically illustrating the heat conversion unit 110 according to an embodiment of the present disclosure. In FIG. 4, the same reference numerals as those of FIG. 2 denote the same elements, and redundant descriptions thereof are omitted for the sake of simplicity.

As a selective embodiment, the heat conversion unit 110 may have a circular column shape, but the present disclosure is not limited thereto and any column shape having a certain height may be employed as the heat conversion unit 110, regardless of the shape thereof. In other words, the heat conversion unit 110 may have the rectangular column shape illustrated in FIG. 3, or any other shapes.

The heat conversion unit 110 may include a first surface 100a, a second surface 100b that is opposite to the first surface 100a, and a hole H penetrating from the first surface 100a to the second surface 100b.

As a selective embodiment, a drive unit 300 may be included in the hole H.

As a selective embodiment, the heat conversion unit 110 may be rotated clockwise or counterclockwise by the drive unit 300. Although FIG. 4 illustrates that the heat conversion unit 110 is rotated counterclockwise, the present disclosure is not limited thereto, and the heat conversion unit 110 may be rotated clockwise or counterclockwise.

The drive unit 300 may be rotated by a motor, but the present disclosure is not limited thereto, and any device capable of providing power to rotate the heat conversion unit 110 may be employed. Although FIG. 4 illustrates that the drive unit 300 has a certain shape to be included in the hole H, the present disclosure is not limited thereto.

The catalyst 200 may be provided outside the heat conversion unit 110.

As a selective embodiment, the catalyst 200 may be located on the surface of the heat conversion unit 110.

As a selective embodiment, the catalyst 200 having a thin and long wire shape may be provide by being wound around the surface of the heat conversion unit 110.

Since other descriptions about the heat conversion unit 110 and the catalyst 200 are already presented above with respect to FIGS. 1 to 3, the descriptions are omitted.

Figure 5:
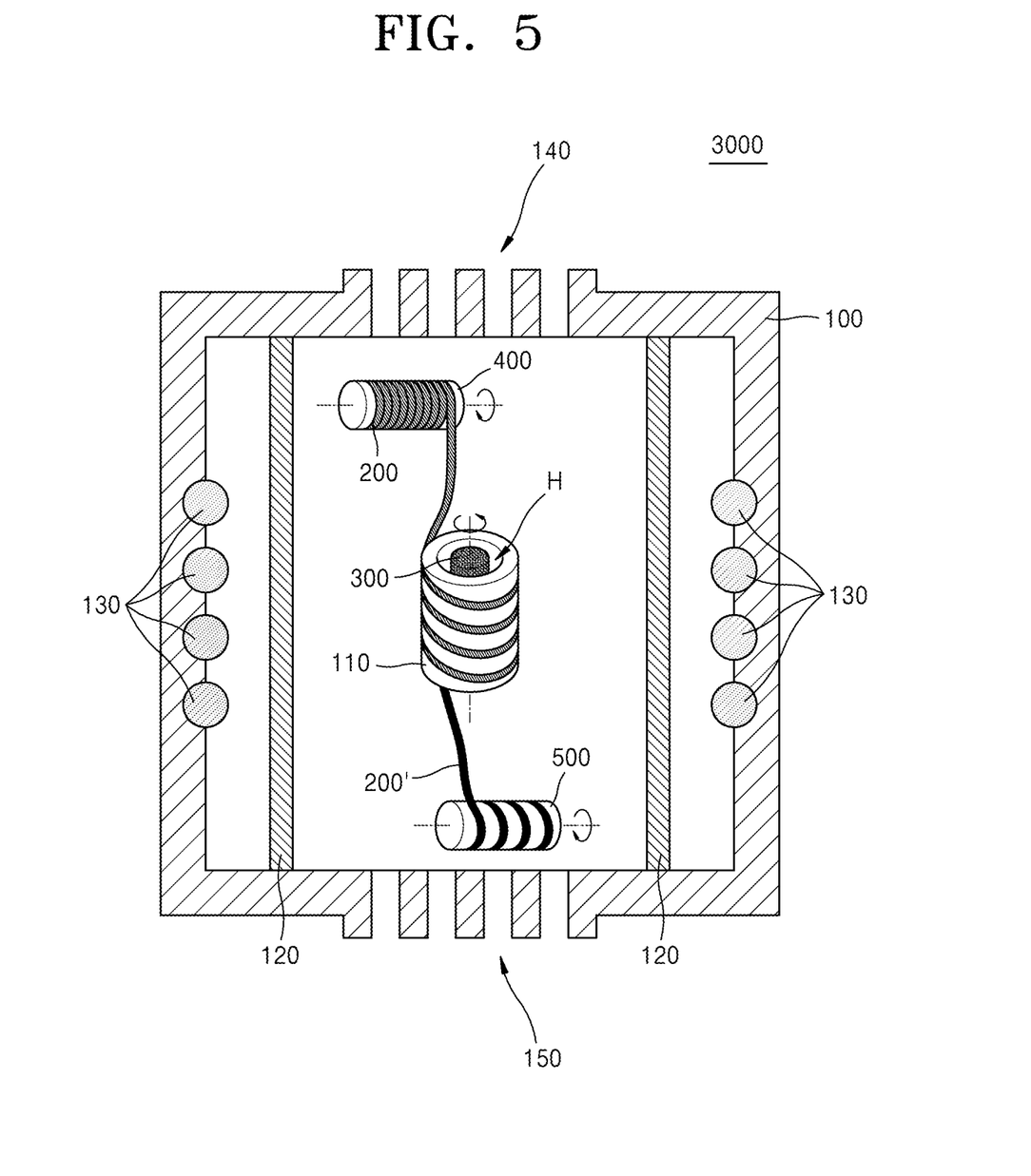
FIG. 5 is a cross-sectional view schematically illustrating a graphene synthesis apparatus according to another embodiment of the present disclosure.

FIG. 5 is a cross-sectional view schematically illustrating a graphene synthesis apparatus 3000 according to another embodiment of the present disclosure. In FIG. 5, the same reference numerals as those of FIGS. 2 and 4 denote the same elements, and redundant descriptions thereof are omitted for the sake of simplicity.

The graphene synthesis apparatus 3000 may include the chamber 100, the heat conversion unit 110 provided in the chamber 100, the heating unit 130, and the catalyst 200. Furthermore, the graphene synthesis apparatus 3000 may further include the quartz wall 120 that maintain a vacuous state of the chamber 100 or prevent contamination of the chamber 100. The graphene synthesis apparatus 3000 may further include the gas supply unit 140, the discharge unit 150, a decompression unit (not shown), and a gate (not shown).

As a selective embodiment, the heat conversion unit 110 may include the hole H, and the drive unit 300 may be included in the hole H. As a selective embodiment, the drive unit 300 may rotate the heat conversion unit 110 clockwise or counterclockwise.

The catalyst 200 may be provided outside the heat conversion unit 110. In other words, the catalyst 200 may be located between the heat conversion unit 110 and the heating unit 130.

As a selective embodiment, the catalyst 200 may be provided on the surface of the heat conversion unit 110.

As a selective embodiment, the catalyst 200 may have a thin and long wire shape, and the catalyst 200 having a wire shape may be provided by being wound around the surface of the heat conversion unit 110.

As a selective embodiment, the graphene synthesis apparatus 3000 according to the present embodiment may further include a first rotation unit 400 and a second rotation unit 500.

The first rotation unit 400 may be provided at one side of the heat conversion unit 110, and the second rotation unit 500 may be provided at the other side of the heat conversion unit 110. In other words, the first rotation unit 400 and the second rotation unit 500 may be located at opposite side with respect to the heat conversion unit 110.

In the graphene synthesis apparatus 3000 according to the present embodiment, as illustrated in FIG. 5, the heat conversion unit 110 may be located at a central portion of the chamber 100, the first rotation unit 400 may be located in an upper portion of the heat conversion unit 110, and the second rotation unit 500 may be located at a lower portion of the heat conversion unit 110.

The structures and materials of the first rotation unit 400 and the second rotation unit 500 are not limited, and any structure and material capable of rotating around a rotation axis may be employed therefor. The first rotation unit 400 and the second rotation unit 500 may be rotated clockwise or counterclockwise.

As illustrated in FIG. 5, the catalyst 200 before graphene synthesis may be wound around the first rotation unit 400. As a selective embodiment, the catalyst 200 in a thin and long wire shape may be wound around the first rotation unit 400. The first rotation unit 400 around which the catalyst 200 before graphene synthesis is wound and the heat conversion unit 110 that is where graphene is synthesized may be provided in the same chamber as illustrated in FIG. 5. However, the present disclosure is not limited thereto, and various modifications are available, for example, the first rotation unit 400 may be provided in a separate chamber or only the catalyst 200 provided by the first rotation unit 400 may be supplied to the inside of the chamber 100.

When the first rotation unit 400 is provided in the same chamber 100 with the heat conversion unit 110 as illustrated in FIG. 5, contamination in the graphene synthesis process may be reduced. The first rotation unit 400 may be arranged apart from an area of the heating unit 130 such that the radiant heat emitted from the heating unit 130 may be supplied as small as possible.

The catalyst 200 provided by being wound around the first rotation unit 400 may be moved from the first rotation unit 400 to the heat conversion unit 110 while the first rotation unit 400 and the heat conversion unit 110 are simultaneously rotated.

As a selective embodiment, as illustrated in FIG. 5, the catalyst 200' after graphene synthesis may be provided by being wound around the second rotation unit 500.

When graphene is synthesized on the catalyst 200 located on the surface of the heat conversion unit 110 in the graphene synthesis apparatus 3000, the catalyst 200' after graphene synthesis may be moved from the heat conversion unit 110 to the second rotation unit 500 while the second rotation unit 500 and the heat conversion unit 110 are simultaneously rotated. A detailed graphene synthesis process is described later.

Figure 6:
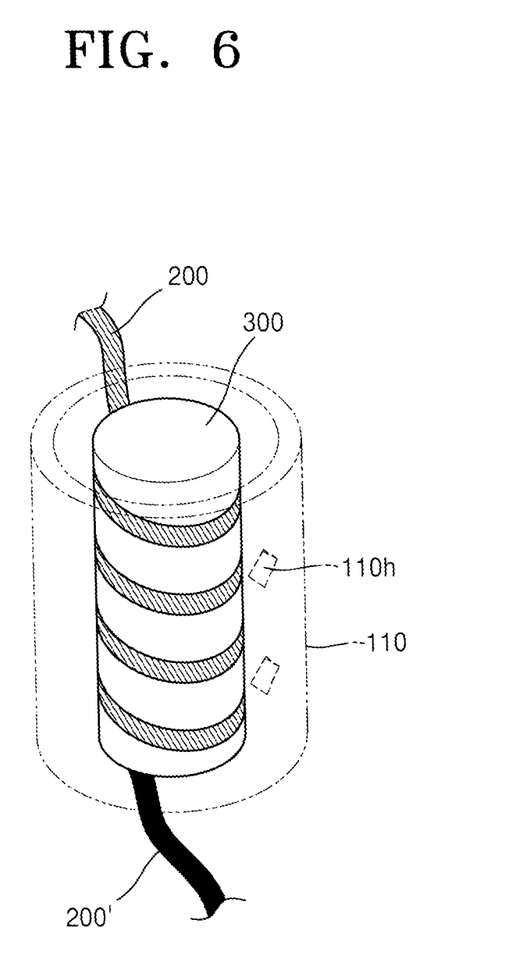
FIG. 6 schematically illustrates a part of a graphene synthesis apparatus according to another embodiment of the present disclosure

FIG. 6 schematically illustrates a part of a graphene synthesis apparatus according to another embodiment of the present disclosure. Referring to FIG. 6, in a graphene synthesis apparatus according to an embodiment, the catalyst 200 may be located inside the heat conversion unit 110. In this case, the catalyst 200 may be provided by being wound around the drive unit 300 that is located inside the heat conversion unit 110. The heat conversion unit 110 may absorb the radiant heat emitted from the heating unit 130 and may transfer the absorbed radiant heat to the drive unit 300. In this state, the drive unit 300 may convert the heat from the heat conversion unit 110 to conductive heat and transfer the converted heat to the catalyst 200. The heat conversion unit 110 may be provided in a cylindrical shape, and the heat conversion unit 110 may have the holes 110h penetrating a side wall of a cylinder. The holes 110h may are provided to facilitate a flow of a gas.

Figure 7:
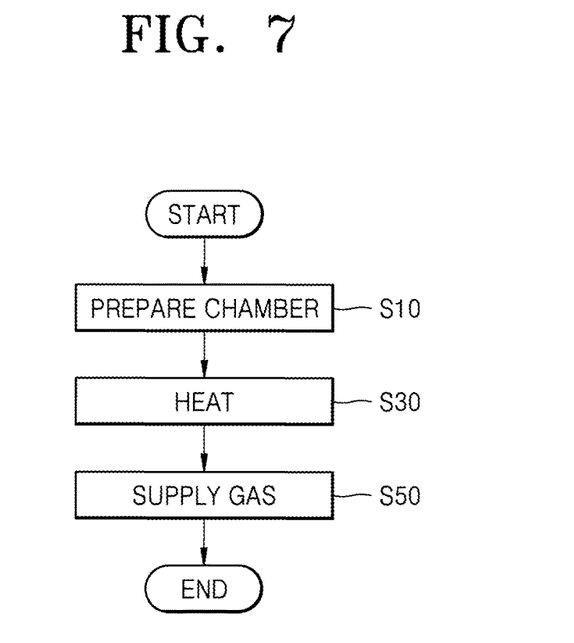
FIG. 7 is a schematic flowchart of a graphene synthesis method according to an embodiment of the present disclosure.
Figure 8:
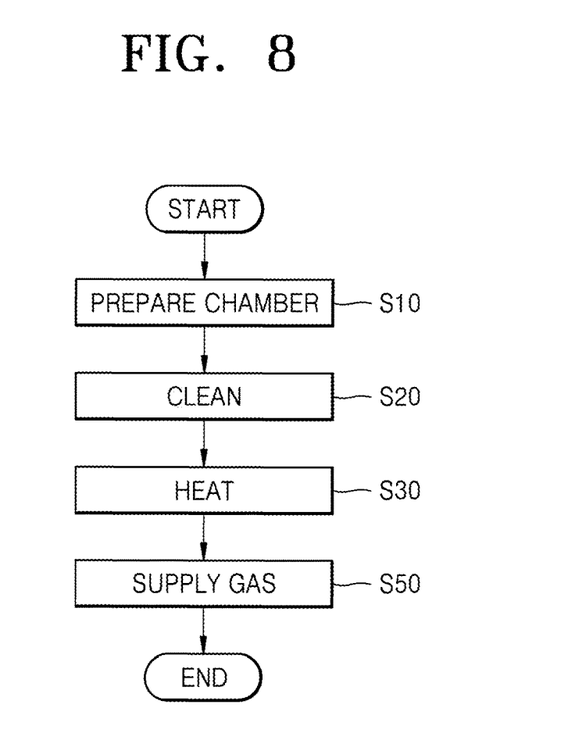
FIG. 8 is a schematic flowchart of a graphene synthesis method according to another embodiment of the present disclosure.

FIG. 7 is a schematic flowchart of a graphene synthesis method according to an embodiment of the present disclosure. FIG. 8 is a schematic flowchart of a graphene synthesis method according to another embodiment of the present disclosure. In the following descriptions, graphene synthesis methods are described in detail with reference to FIGS. 7 and 8.

The below-described graphene synthesis methods use the above-described graphene synthesis apparatuses 1000 and 3000 (see FIGS. 2 and 5). In FIG. 7, the same reference numerals as those of FIGS. 2 and 5 denote the same elements, and redundant descriptions thereof are omitted for the sake of simplicity First, referring to FIGS. 2 and 7, in a graphene synthesis method according to an embodiment, an operation of preparing the chamber 100 may be performed (S10).

The chamber 100 may include the heating unit 130 and the heat conversion unit 110 therein. The heat conversion unit 110 may be located at the central portion of the chamber 100, and the heating unit 130 may be located at an edge portion of the chamber 100, relative to the heat conversion unit 110.

The catalyst 200 may be arranged between the heat conversion unit 110 and the heating unit 130. As a selective embodiment, the catalyst 200 may be located on the surface of the heat conversion unit 110.

The catalyst 200 may be provided in a thin and long wire shape.

In other words, in the graphene synthesis method according to the present embodiment, since the catalyst 200 is provided on the surface of the heat conversion unit 110, even when the catalyst 200 is provided in a wire shape, not a thin shape, graphene may be efficiently synthesized on the catalyst 200 that is metal.

As a selective embodiment, the quartz wall 120 may be provided in the chamber 100. The quartz wall 120 may maintain a vacuous state of the chamber 100.

As a selective embodiment, the quartz wall 120 may be provided between the heat conversion unit 110 and the heating unit 130.

Next, a gas in the chamber 100 is discharged by using a vacuum pump (not shown) to the outside though a decompression unit (not shown). The inside of the chamber 100 may have a pressure state lower than the atmospheric pressure, for example, about $10^{-2}$ torr to about $10^{-6}$ torr.

As described above, the inside of the chamber 100 may be maintained in a vacuous state by the quartz wall 120.

Next, referring to FIGS. 2 and 6, an operation of heating the heating unit 130 that supplies radiant heat may be performed (S30).

As a selective embodiment, the heating unit 130 may include a lamp and may supply radiant heat to the inside of the chamber 100.

The temperature of the heat conversion unit 110 may be increased by the radiant heat emitted from the heating unit 130.

As a selective embodiment, the heat conversion unit 110 may include a black body (Graphite), and may convert the radiant heat to conductive heat.

When the radiant heat is converted to conductive heat by the heat conversion unit 110, heat may be easily transferred to the catalyst 200 located on the surface of the heat conversion unit 110, and the catalyst 200 may be efficiently heated to a temperature for graphene synthesis. In other words, the inside of the chamber 100 is heated to a sufficient temperature for graphene synthesis.

The catalyst 200 may be formed of metal, and since the catalyst 200 has high reflectivity, the catalyst 200 may reflect most of the radiant heat supplied by the heating unit 130. In this case, since the catalyst 200 is not easily heated, a long time may be needed to reach a temperature for graphene synthesis.

In addition, when the catalyst 200 is provided in a thin and long wire shape, different from a thin shape, an area for receiving heat is decreased, and thus it may be difficult to control the temperature.

In contrast, in the graphene synthesis method according to the present embodiment, as described above, since the heat conversion unit 110 converts the radiant heat to conductive heat, and heat is easily transferred to the catalyst 200 having a wire shape and located on the surface of the heat conversion unit 110, temperature may be easily controlled.

Next, referring to FIGS. 2 and. 6, an operation of supplying a gas including carbon, that is, a reaction gas, through the gas supply unit 140 may be performed (S50).

As a selective embodiment, a methane ($CH_4$) gas may be supplied as the gas including carbon.

A reaction gas including carbon is decomposed into a state needed for graphene synthesis by receiving energy from the inside of the chamber 100.

As a selective embodiment, when the methane ($CH_4$) gas is used as the reaction gas, the methane ($CH_4$) gas dissociates into carbon (C) and hydrogen (H) in the chamber 100.

When the reaction gas passes through the inside of the chamber 100 where high temperature environment is established, the reaction gas contacts a surface of the catalyst 200 provided outside the heat conversion unit 110. As the reaction gas decomposed in the above process is absorbed by the catalyst 200 that is surface-activated, graphene crystal grows.

In other words, as graphene crystal grows on the surface of the catalyst 200, a graphene coating film having a certain thickness may be synthesized.

As a selective embodiment, as described above, as the temperature of the inside of the chamber 100 is rapidly increased within a fast time of several seconds to several minutes to a temperature sufficient for graphene synthesis, a graphene coating film may be deposited on the surface of the catalyst 200 that is metal, by a rapid-thermal CVD.

Although in the present embodiment a method of supplying a gas including carbon after the catalyst 200 is heated by the heating unit 130 and the heat conversion unit 110, the present disclosure is not limited thereto.

As a selective embodiment, as graphene is cooled after being synthesized on the surface of the catalyst 200 that is metal in the chamber 100 at high temperate, the graphene coating film may be stabilized.

FIG. 8 is a schematic flowchart of a graphene synthesis method according to another embodiment of the present disclosure. In FIG. 8, the same reference numerals as those of FIGS. 2 and 6 denote the same elements, and redundant descriptions thereof are omitted for the sake of simplicity Referring to FIG. 8, first, an operation of preparing the chamber 100 may be performed (S10), and then, an operation of cleaning in which an ambient gas and/or a non-reactive gas is injected may be performed (S20).

In other words, an ambient gas, for example, an inert gas such as helium or argon and/or a non-reactive gas such as hydrogen to maintain a surface of a metal thin plate clean may be injected through the gas supply unit 140.

Next, by sequentially performing the heating operation (S30) and the gas supply operation (S50) of supplying a reaction gas, graphene may be synthesized on the surface of the catalyst 200 that is metal.

Although not illustrated in the drawings, the graphene synthesis method according to another embodiment may further include the first rotation unit 400 and the second rotation unit 500 in the chamber 100 in the operation (S10) of preparing the chamber 100.

As a selective embodiment, the first rotation unit 400 may be arranged at one side of the heat conversion unit 110, and the second rotation unit 500 may be arranged at the other side of the heat conversion unit 110. In other words, the first rotation unit 400 and the second rotation unit 500 may be located at opposite sides with respect to the heat conversion unit 110.

The structures and materials of the first rotation unit 400 and the second rotation unit 500 are not limited, and any structure and material capable of rotating around a rotation axis may be employed therefor. The first rotation unit 400 and the second rotation unit 500 may be rotated clockwise or counterclockwise.

As a selective embodiment, the catalyst 200 before graphene synthesis may be provided by being wound around the first rotation unit 400. Furthermore, the catalyst 200' after graphene synthesis may be provided by being wound around the second rotation unit 500.

As described above, a loading operation may be performed while the heating operation (S30) and the gas supply operation (S50) are performed in the chamber 100 in which the heating unit 130, the heat conversion unit 110 having a surface on which the catalyst 200 is located, the quartz wall 120, the first rotation unit 400, and the second rotation unit 500 are arranged.

In the loading operation, the catalyst 200 having a wire shape and wound around the first rotation unit 400 is moved to the heat conversion unit 110 by rotating the first rotation unit 400 and the heat conversion unit 110.

In other words, while moving the catalyst 200 that is metal from the first rotation unit 400 to the heat conversion unit 110, graphene may be synthesised on the surface of the catalyst 200 that is metal.

In this case, since the catalyst 200 is continuously and newly supplied, graphene is synthesized on the surface of the heat conversion unit 110, a large amount of graphene may be synthesized.

Furthermore, an unloading operation may be performed while the heating operation S30 and the gas supply operation S50 are performed.

In the unloading operation, by rotating the second rotation unit 500 and the heat conversion unit 110, the catalyst 200' on which graphene is synthesized in the heat conversion unit 110 may be moved to the second rotation unit 500.

Accordingly, since the catalyst 200' on which graphene is synthesized is moved from the heat conversion unit 110, the catalyst 200 is continuously and newly provided onto the surface of the heat conversion unit 110 to synthesize graphene, and thus a large amount of graphene may be efficiently synthesized.

While the present disclosure has been particularly shown and described with reference to preferred embodiments, the embodiments and terminologies should be considered in descriptive sense only and not for purposes of limitation. Therefore, it will be understood by those of ordinary skill in the art that various changes in form and details may be made therein without departing from the spirit and scope of the present disclosure as defined by the following claims.

The invention claimed is:

1. A graphene synthesis apparatus comprising:
a chamber;
a heating unit provided in the chamber;
a heat conversion unit provided closer to a central portion of the chamber than the heating unit, wherein the heat conversion unit has a circular or rectangular column shape;
a catalyst provided on the heat conversion unit, wherein the catalyst has a wire shape, and is wound around an outer surface of the heat conversion unit; and
a quartz wall provided in the chamber, wherein the quartz wall is arranged between the heating unit and the heat conversion unit,
wherein the catalyst is formed of thin and long metal, and
wherein the catalyst directly receives a radiant heat of the heating unit.

2. A graphene synthesis apparatus comprising:
a chamber;
a radiant heat source provided in the chamber;
a heat conversion unit having ends and an outer surface to receive radiant heat from the radiant heat source, the heat conversion unit provided closer to a central portion of the chamber than the radiant heat source;
a catalyst provided on the outer surface of the heat conversion unit, wherein the catalyst is provided between the outer surface and the radiant heat source,
wherein the catalyst is formed of thin and long metal, wherein the thin and long metal is arranged on the outer surface without covering a first area of the outer surface of the heat conversion unit, wherein a reflectivity of the first area is less than a reflectivity of a surface of the thin and long reflective metal; and the heat conversion unit to deliver conductive heat converted from the received radiant heat to the catalyst via a second area of the outer surface of the heat conversion unit, wherein the catalyst has a wire shape, and the catalyst is wound around the outer surface.

3. A graphene synthesis apparatus comprising:
a chamber;
a radiant heat source provided in the chamber;
a body having ends and an outer surface to receive radiant heat from the radiant heat source, the body provided closer to a central portion of the chamber than the radiant heat source;
a catalyst provided on the outer surface of the body, wherein the catalyst is provided between the outer surface and the radiant heat source, and
wherein the catalyst is formed of thin and long metal, wherein the thin and long metal is arranged on the outer surface of the body to expose a first area of the outer surface of the body, wherein a reflectivity of the first exposed area is less than a reflectivity of a surface of the thin and long reflective metal; and
the body to deliver conductive heat converted from the received radiant heat to the catalyst via a second covered area of the outer surface of the body;
wherein the catalyst has a wire shape, and the catalyst is wound around the outer surface of the body.

4. The graphene synthesis apparatus of claim 3, further comprising a quartz wall provided in the chamber,
wherein the quartz wall is arranged between the radiant heat source and the body.

5. The graphene synthesis apparatus of claim 4, wherein the quartz wall is arranged in a direction perpendicular to the ground or a direction parallel to the ground.

6. The graphene synthesis apparatus of claim 3, wherein the outer surface comprises graphite.

7. The graphene synthesis apparatus of claim 3, wherein the body has a circular or rectangular column shape, wherein the outer surface comprises a sidewall of the circular column shape or sidewalls of the rectangular column shape.

8. The graphene synthesis apparatus of claim 3, wherein the body comprises a hole penetrating from one of the ends to the other end, wherein a drive unit is provided in the hole, and
the drive unit is configured to rotate the body clockwise or counterclockwise.

9. The graphene synthesis apparatus of claim 3, comprising:
a first rotation unit provided between the body and one end of the chamber; and
a second rotation unit provided between the body and another end of the chamber.

10. The graphene synthesis apparatus of claim 9, wherein a first section of the catalyst is wound around a surface of the first rotation unit and a second different section of the catalyst is wound around a surface of the second rotation unit, wherein the second different section of the catalyst has graphene synthesized thereon.

11. A graphene synthesis method comprising:
preparing a chamber including a heat conversion unit and a radiant heat source having ends and an outer surface, the radiant heat source provided closer to an edge portion of the chamber than the heat conversion unit; and
supplying a reaction gas to an inside of the chamber,
wherein a catalyst formed of thin and long metal is arranged on the outer surface of the heat conversion unit between the outer surface and the radiant heat source without covering a first area of the outer surface of the heat conversion unit, wherein a reflectivity of the first area is less than a reflectivity of a surface of a surface of the thin and long reflective metal;
heating with the radiant heat source, wherein radiant heat is received on the first area of the outer surface of the heat conversion unit; and
delivering conductive heat converted from the received radiant heat by the heat conversion unit to the catalyst via a second area of the outer surface of the heat conversion unit,
wherein the catalyst has a wire shape, and the catalyst is wound around the outer surface.

12. The graphene synthesis method of claim 11, further comprising, before performing the heating, cleaning by injecting an atmospheric gas or a non-reactive gas into the chamber.

13. The graphene synthesis method of claim 11, wherein a quartz wall is located in the chamber between the radiant heat source and the heat conversion unit.

14. The graphene synthesis method of claim 11, wherein, in the chamber, a first rotation unit is provided at one side of the heat conversion unit; and
a second rotation unit is provided at another side of the heat conversion unit.

15. The graphene synthesis method of claim 14, further comprising loading a first section of the catalyst from the first rotation unit to the heat conversion unit while the heating is being performed.

16. The graphene synthesis method of claim 14, further comprising unloading a second different section of the catalyst from the heat conversion unit to the second rotation unit while the heating is being performed, wherein the second section of the catalyst has graphene synthesized thereon.

* * * * *